No. 765,740. PATENTED JULY 26, 1904.
W. KÖLLERMEYER.
METALLIC ROD PACKING.
APPLICATION FILED MAR. 3, 1903.
NO MODEL.
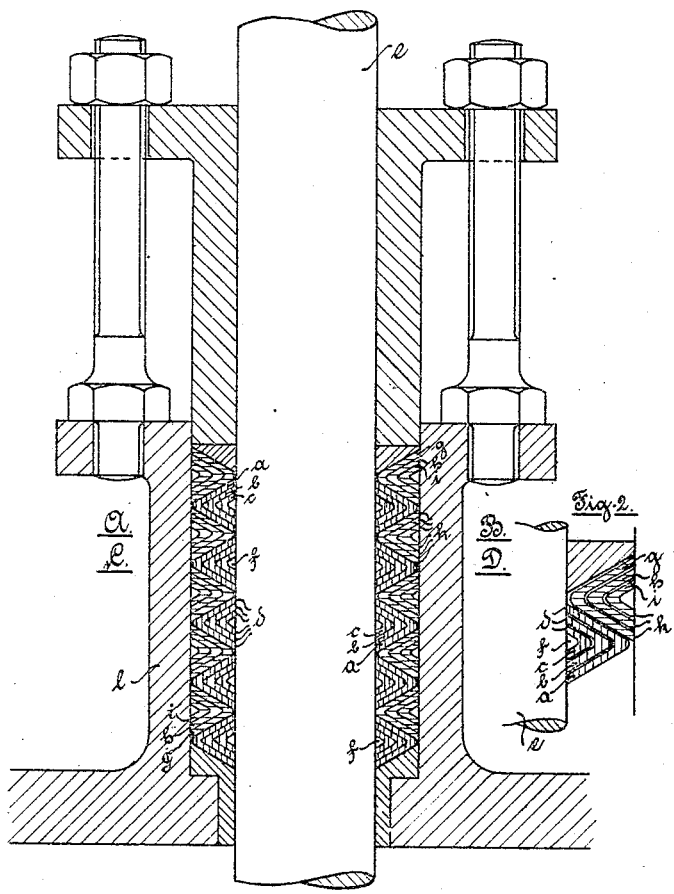
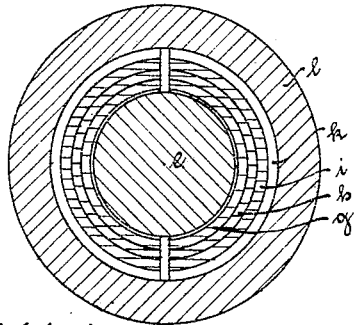
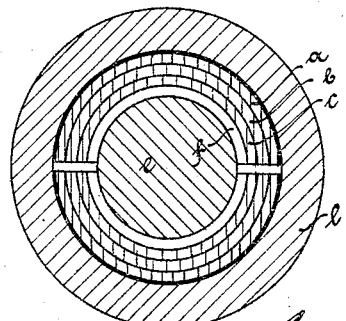
Witnesses
Inventor
Wilhelm Köllermeyer
By Wm. E. Boulter
Attorney No. 765,740. Patented July 26, 1904.

UNITED STATES PATENT OFFICE.

WILHELM KÖLLERMEYER, OF HÖRDE, GERMANY.

METALLIC ROD-PACKING.

SPECIFICATION forming part of Letters Patent No. 765,740, dated July 26, 1904.

Application filed March 3, 1903. Serial No. 145,965. (No model.)

*To all whom it may concern:*

Be it known that I, WILHELM KÖLLERMEYER, a subject of the Emperor of Germany, residing at Hörde, Westphalia, Germany, have invented certain new and useful Improvements in Metallic Rod-Packing, of which the following is a specification.

This invention relates to a metallic packing for stuffing-boxes and the like, and comprises inner rings or layers made of soft metal and pressed against the piston-rod by the outer rings or layers, which are springy and made of a harder metal.

A packing according to this invention is illustrated by way of example in the accompanying drawings, in which—

Figure 1 is a vertical longitudinal section through a stuffing-box; Fig. 2, a section through a set of rings on a slightly larger scale; Fig. 3, a cross-section on the line A B; and Fig. 4, a cross-section on the line C D, Fig. 1.

The packing is made up of two series of metallic layered or nested rings of V or similar angular cross-section alternately arranged, one series, $a\ b\ c$, having its apices, as seen in sections, pointing away from the piston-rod $e$, so that the edges or faces $d$ are presented toward the said rod, while the next series, $g\ h\ i$, is arranged so that the apices are toward the piston-rod $e$ and the edges or faces $k$ toward the inner wall of the stuffing-box $l$. The two series of rings or layers are of such cross-section that the adjacent surfaces of one series will fit the corresponding surfaces of the next series. As shown, the rings are each constituted by several V-section rings $a\ b\ c$ and $g\ h\ i$, fitted or nested together, so that the six end faces $d$ or $k$ of the alternately-arranged rings form straight lines, as seen in section, throughout the packing and fit the piston-rod $e$ and the wall of the stuffing-box, respectively.

The rings $a\ b\ c\ g\ h\ i$ are preferably constructed so that the sides inclose an angle of about seventy-five degrees, and the inner rings are made of softer metal or alloy than the outer rings, which are springy and made of a harder metal, so as to press the inner rings against the piston-rod. The rings are preferably made of a suitable metal alloy (such as aluminium and zinc and aluminium and lead) according to the degree of hardness required.

The bends of the outer rings $a$ and $d$ form circular grooves in which collect the lubricating-oil. It is true that packings with rings made of angle-rings fitted into each other are already known, but they have the disadvantage of their cross-section being too large and of the springiness of the few thin rings being insufficient to bring about a uniform and soft pressure of all the rings, so that the gland must be very strongly screwed down, this resulting in a strong friction between the piston-rod and the packing and causing them quickly to wear out. This drawback is obviated by the use of packing according to this invention.

In using the packing according to this invention a tight joint is obtained by screwing down the gland to a very small extent, which results in the rings $g$, $h$, and $i$, owing to their small thickness and to their cross-section, pressing the packing-rings proper, $a\ b\ c$, against the rod $e$ with a slight and springy pressure.

Any leakage of steam is effectively prevented by the large number of the zigzag lines of the rings and, on the other hand, by the oil collecting in the circular grooves $f$. Owing to the grooves $f$ forming several rings of oil round the piston-rod, the latter is always well lubricated, so that it is not necessary to have a special lubricating device.

What I claim as my invention, and desire to secure by Letters Patent, is—

1. Metallic packing for stuffing-boxes and the like comprising a plurality of oppositely-arranged rings each formed of a plurality of V-shaped rings of angular cross-section, substantially as set forth.

2. Metallic packing for stuffing-boxes and the like comprising a plurality of oppositely-arranged nested spring-rings of V-shaped section the inner rings being of softer metal than the outer rings, substantially as set forth.

In testimony whereof I have signed my name to this specification in the presence of two subscribing witnesses.

WILHELM KÖLLERMEYER.

Witnesses:
OTTO KÖNIG,
J. A. RITTERSHAUS.